April 5, 1960
F. PETERSON
2,931,114
ARTICLE FOR ATTACHING TO A VEHICLE VISOR
Filed March 21, 1957
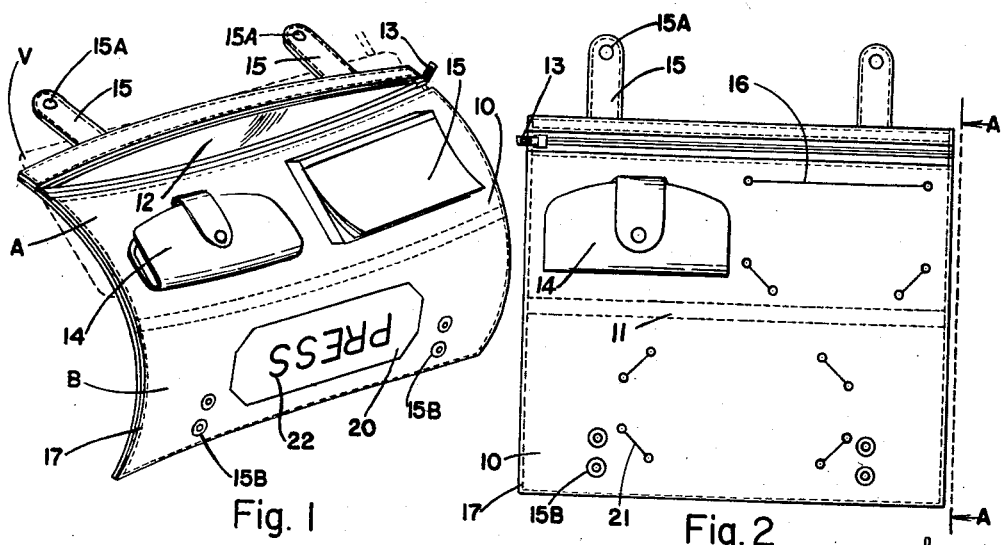
Fig. 1
Fig. 2
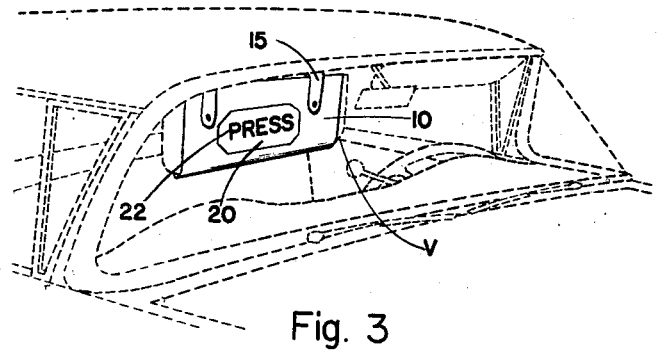
Fig. 3
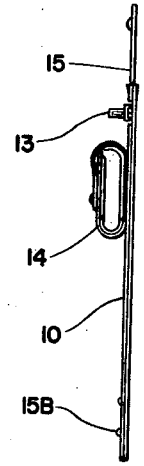
Fig. 4
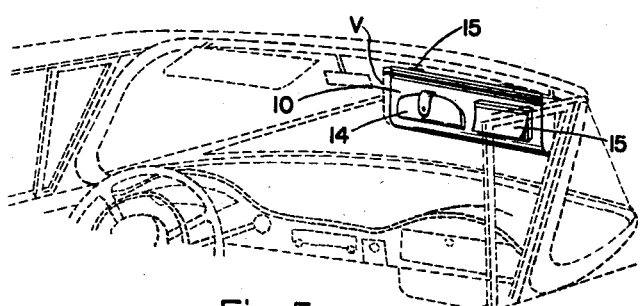
Fig. 5
INVENTOR
FRED PETERSON
BY
ATTORNEY

United States Patent Office 2,931,114
Patented Apr. 5, 1960

2,931,114

ARTICLE FOR ATTACHING TO A VEHICLE VISOR

Fred Peterson, St. Paul, Minn., assignor to Brown & Bigelow, St. Paul, Minn., a corporation of Minnesota Application March 21, 1957, Serial No. 647,527

3 Claims. (Cl. 40—10)

This invention relates to a new and improved accessory for use in automobiles, trucks, ambulances and other types of vehicles. More particularly, the invention comprehends a novel sun visor attachment formed of leather or plastic that may be used for the storage of various travel accessories such as maps, note pads, sun glasses and the like, characterized by a provision for attaching a relatively large placard or indicia thereto so as to provide a convenient means of identifying either the owner of the vehicle or the vehicle itself, or any other suitable personage for whom identification may prove desirable. For example, the visor attachment may be used by newspapers to afford ready recognition to their reporters when proceeding to a place of news worthy attention; industrial concerns may find it useful for identifying employees as they pass in and out of the confines of their work area; indeed, such recognition is becoming more and more important as security regulations and defense plant interdictions grow in scope and multiply in number. Doctors, police officials, and fire department personnel are a few of the many types of individuals who undoubtedly will welcome the convenience of a visor article case having means associated therewith to provide ready identification for themselves and their vehicles.

Heretofore, it has been necessary to apply adhesive stickers with messages printed thereon to the vehicle windshields or to use adhesive tape to hold cards or other identifying media in view. Such windshield stickers, while having some utility, serve to obscure vision for those in the vehicle and, moreover, are very difficult to remove after use. In fact, most identifying means for automobiles are characterized by their inconvenience, the inherent safety hazards due to obstruction of view, and limitations imposed upon quick and easy changes.

Accordingly, it is a broad object of this invention to provide a means of identifying a vehicle.

Another object of the present invention is to provide a safe and easily removable means of identifying a vehicle from without the vehicle.

Another object of the present invention is to provide an improved visor attachment for a vehicle.

A further object of this invention is to provide in an automobile visor accessory case means integral therewith for identifying a particular vehicle or class of individuals.

Still other and further objects will at once become apparent to those skilled in the art from a consideration of the accompanying drawings in which is shown one embodiment of the invention by way of illustration only.

In the drawings:

Figure 1 is a perspective view of the visor attachment with an identifying card therein;

Figure 2 is a plan view of the visor attachment with the identifying card removed therefrom;

Figure 3 is a side elevational view of the visor shown in Figure 2;

Figure 4 shows the invention applied to an automobile visor as viewed from the outside from a vantage point forward of the automobile; and Figure 5 illustrates the invention applied to an automobile visor as viewed from a vantage point to the rear of and outside the automobile.

Referring now to the drawings, Figure 1 shows an embodiment of the present invention wherein a main body portion 10 is provided of suitable material such as leather or plastic. Two flat rectangular shaped pieces of material may be used in the fabrication of the device as shown more clearly in Figure 3. The article may be stitched along the edges thereof (as indicated in Figures 1 and 2 by stitches 17) or if heat sensitive polyethylene materials are used they may be heat sealed in accordance with well known techniques. The body 10 is stitched on each side of its longitudinal centerline at 11 to create a fold line thereby permitting it to be folded over the visor. A pocket 12 provided on one side A of the fold is adapted to be closed by slide fastener means 13, or it may be left without closure means to provide handy access thereto.

A case 14 for sunglasses may be attached to body 10 and a note pad 15 may be inserted in slits 16 as shown in Figure 2. Of course, other convenient articles may be attached to the side A of the body 10 of the visor case such as a pencil loop, a change purse, or articles of a similar nature. Straps 15 equipped with snap fasteners 15a project from side A of body 10 and cooperate with mating fasteners 15b disposed upon side B to securely hold the case to a vehicle visor. The mating fasteners 15b may be several in number and situated apart from each other a suitable distance to provide adjustment for accommodating the visor case to visors of varying width. As an alternative, straps 15 may cooperate with similar straps located on side B in place of fasteners 15b to provide even greater flexibility of adjustment.

Side B of body portion 10 is cut with slits 21 as shown in Figure 2 to allow an identifying placard 20 to be inserted therein. In the illustrations shown, placard 20 carries indicia 22 labeled "PRESS" indicating that the vehicle or operator thereof is associated in an official capacity as a member of the newspaper profession and thus is entitled to whatever official privileges that prevail at the time and place in question. It follows, of course, that indicia 22 may read on a variety of different titles such as "Doctor," "Police," "Official Car," and others.

It should be apparent that indicia on placard 20 may be permanently attached to body 10 as by sewing placard 20 thereto or by printing indicia 22 permanently on body 10. Permanency of indicia 22 may be desired in such applications as for example a police department where squad cars are permanently assigned for official use or when a physician is the sole user of the automobile. Temporary inserts may prove more useful in those instances where an automobile is owned by a public body such as a city and is temporarily loaned out for individual departmental uses.

Figures 4 and 5 show how the invention appears when in an operative position. Although the figures show the device installed on the side of the car away from the driver it can be readily seen that the visor may be attached on the driver's side or for that matter, both visors can be so equipped. By simply rotating the visor upwardly the placard may be removed from view. The embodiment employing a temporary placard has the further advantage of allowing the visor to be used for shielding glare without continual exposure of the card. This may be desirable in the case of a detective squad car traveling incognito and being suddenly confronted with a situation demanding immediate recognition of its official status. Another instance might be in the case of a doctor on vacation who is caught in an emergency requiring similar attention to this capacity.

Thus it can be seen that this invention provides a novel visor attachment apparatus that is extremely useful for various members of society, those affected with a public interest as well as private individuals or organizations.

It will, of course, be understood that various details of construction may be varied through the wide range from the principles of this invention and therefore the scope of this invention should not be limited to the embodiment described but should be construed in the light of the following claims.

I claim:

1. A one piece resilient device adapted to fold substantially around a motor vehicle sun visor consisting of a substantially rectangular body having a first and a second longitudinal edge, means for retaining articles adjacent the first longitudinal edge of said rectangular body, a longitudinal stitched seam adjacent said retaining means, said seam being positioned intermediate the first and second longitudinal edges of said rectangular body, an identifying placard secured to said rectangular body by a plurality of slots intermediate said seam and the second longitudinal edge of said rectangular body, and means for releasably securing said device to the sun visor.

2. An article for attachment to an automobile sun visor being adjustable from a retracted to a downward position comprising in combination; a blank foldable upon a transverse line forming first and second sides for enclosing the sun visor, the first side having a plurality of slots and a looped member for securing travel accessories to the outer surface thereof; a rectangular placard removably secured to the second side of said blank by a plurality of slots polyangularly disposed in said blank to receive the corners of said placard, said placard being visible when the visor is adjusted to downward position; and means for releasably securing the free ends of the first and second sides of said blank to the top of the sun visor.

3. An apparatus for attachment to an automobile sun visor being adjustable from a retracted to a downward position comprising in combination; a rectangular blank composed of two sheets, one superimposed over the other and joined together along their respective edges, one of the sheets having an opening adjacent one of its longitudinal edges to provide an entrance to a pocket formed by the superimposed position of the sheets; a plurality of transverse parallel stitches at the midline of said blank forming a lower terminus of the pocket formed by the superimposed sheets and dividing said blank into first and second sides of equal size, one foldable over the other along said stitches for enveloping the sun visor, the outer surface of the first side of said blank having slot and loop means for securing travel accessories thereto; a rectangular placard removably secured to the outer surface of the second side of said blank by a plurality of polyangularly disposed slits in the second side for receiving the corners of said placard, said placard being visible when the sun visor is adjusted to downward position; and means secured to the free ends of the first and second sides of said blank for releasably securing said article to the sun visor.

References Cited in the file of this patent

UNITED STATES PATENTS

| | | |
|---|---|---|
| 1,301,418 | Frost | Apr. 22, 1919 |
| 1,974,661 | Singer | Sept. 25, 1934 |
| 2,181,324 | Glover | Nov. 28, 1939 |
| 2,198,718 | Cobbs | Apr. 30, 1940 |
| 2,287,581 | Walker | June 23, 1942 |
| 2,536,773 | Saidel | Jan. 2, 1951 |
| 2,537,196 | Tanski | Jan. 9, 1951 |
| 2,757,471 | Vlock | Aug. 7, 1956 |